(12) United States Patent
Taneja et al.

(10) Patent No.: US 7,620,991 B2
(45) Date of Patent: Nov. 17, 2009

(54) OPTIMIZED NETWORK CACHE FOR VIRUS SCANNING BY EXAMINING THE MAGIC BYTES OF A FILE

(75) Inventors: Manik Taneja, Pune (IN); John Martin, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 797 days.

(21) Appl. No.: 11/253,405

(22) Filed: Oct. 19, 2005

(65) Prior Publication Data

US 2007/0038637 A1 Feb. 15, 2007

(30) Foreign Application Priority Data

Aug. 12, 2005 (IN) .................. 2156/DEL/2005

(51) Int. Cl.
*G06F 21/00* (2006.01)
(52) U.S. Cl. ...................................... 726/24
(58) Field of Classification Search ............... 709/219, 709/223; 726/22, 24
See application file for complete search history.

(56) References Cited

U.S. PATENT DOCUMENTS 6,173,291 B1 * 1/2001 Jenevein .................... 707/200
6,983,296 B1 1/2006 Muhlestein et al.

OTHER PUBLICATIONS

"Internet Content Adaptation Protocol (ICAP), Network Appliance, Version 1.01." Jul. 30, 2001. Available at http://www.icap-forum.org/documents/specification/icap_whitepaper_v1-01.pdf. Downloaded Mar. 6, 2009.*

M. Muhlestein and Wesley R. Witte, United States Patent Application for a "System and Method for Tracking Modified Files in a File System" With U.S. Appl. No. 10/217,119, filed Aug. 12, 2002.

Freed and N. Borenstein, "Multipurpose Internet Mail Extensions (MIME) Part One: Format of Internet Message Bodies" RFC 2045, Nov. 1996.

J. Elson and A. Cerpa, "Internet Content Adaptation Protocol (ICAP)", RFC 3507, Apr. 2003.

* cited by examiner

*Primary Examiner*—Nasser G Moazzami
*Assistant Examiner*—Travis Pogmore
(74) *Attorney, Agent, or Firm*—Cesari and McKenna, LLP

(57) ABSTRACT

A system and method is provided for reliably detecting the file type of a client-requested and by-passing conventional ICAP processing if the detected file type corresponds to a non-viral file. The client-requested file is examined to determine whether it contains a predefined byte pattern (or "file signature") corresponding to a non-viral type. The signature may be embodied as one or more predetermined "magic bytes" located at known offsets. For instance, the client-requested may be identified as a particular type of image file if it contains the set of magic bytes associated with that image format. Unlike prior implementations, when the client-requested file is determined to contain magic bytes corresponding to a non-viral file type, such as an image file, the file is returned to the requesting client without performing conventional ICAP virus-scanning operations.

39 Claims, 4 Drawing Sheets

| FILE TYPE 310 | SUB-TYPE 320 | MAGIC BYTES (HEXADECIMAL) 330 | BYTE OFFSET(S) 340 |
|---|---|---|---|
| JPEG | JFIF | 0xFFD8FFE0, 0x4A464946 | 0, 6 |
| GIF | 87a | 0x474946383761 | 0 |
| GIF | 89a | 0x474946383961 | 0 |
| ... | ... | ... | ... |

FILE SIGNATURE TABLE 300

FIG. 3

OPTIMIZED NETWORK CACHE FOR VIRUS SCANNING BY EXAMINING THE MAGIC BYTES OF A FILE

FIELD OF THE INVENTION

The present invention relates to storage systems and, more specifically, to a system and method for identifying non-viral files without having to perform conventional Internet Content Adaptation Protocol (ICAP) processing.

BACKGROUND OF THE INVENTION

In general, a server may be configured to provide information to one or more clients according to a client/server model of information delivery. In this model, the server is a storage system that typically contains one or more mass storage devices, such as magnetic hard disks, in which information may be stored and retrieved as desired. The server is usually deployed over a computer network comprising a geographically distributed collection of interconnected communication links, such as Ethernet, optical or wireless links, that allow the clients to remotely access the server's stored information. The clients may include network devices or computers that are directly or indirectly attached to the server, e.g., via point-to-point links, shared local area networks (LAN), wide area networks (WAN) or virtual private networks (VPN) implemented over a public network such as the Internet. Yet other clients may include software applications executing on computers that are configured to communicate with the server.

In some client/server arrangements, the server may be configured as a network cache that buffers previously-accessed or frequently-accessed client information. As such, the server provides a set of clients with faster access to the buffered information than if they were to access the same information directly from the origin servers that normally serve the information. For instance, the set of clients may be physically situated closer to the network cache than to the origin servers, or the clients may be able to access the cache over a lower latency (or higher bandwidth) data path, etc. The network cache's buffered information is typically in the form of files which are made accessible to the set of clients. As used herein, a file is any collection of data that is identifiable by a common name, such as a uniform resource locator (URL), and therefore may include conventional files, HyperText Mark-up Language (HTML) files ("web pages") or other data objects.

In practice, a network cache can be configured to operate as a "reverse proxy" or "forward proxy" cache. A reverse-proxy cache is a server that stores a selected set of information from one or more origin servers. For example, a multimedia company may copy selected streaming audio or video content from its origin servers to a reverse-proxy cache, which is then used as an "accelerator" for providing the selected content to clients.

In contrast, a forward-proxy cache is a server that buffers network data for a particular set of clients. Accordingly, unlike the reverse-proxy cache, the forward-proxy cache does not necessarily store selected data from specific origin servers and instead may store data from a variety of different origin servers, i.e., based on the network traffic patterns of the cache's particular set of clients.

Clients typically communicate with a network cache by exchanging discrete packets of data formatted according to predefined file-access protocols, such as the HyperText Transfer Protocol (HTTP), Network File System (NFS) protocol, Common Internet File System (CIFS) protocol, File Transfer Protocol (FTP), etc. A client may issue a file-access request that specifies, among other things, a specific file to access and a particular file operation to perform. The network cache receives the client request, processes the request, and when appropriate returns a response. For example, the client may issue a file "read" request to the cache, and, in response, the cache may return a file-access response containing the client's requested file.

Often, the file-access requests and responses that are exchanged between a network cache and its clients include one or more packet headers, such as Multipurpose Internet Mail Extensions (MIME) headers, containing file content and disposition information. For instance, a client's file-access request or response may include MIME headers that specify the type of content requested, a type of content-transfer-encoding, a uniform resource identifier (URI) or uniform resource locator (URL) identifying a particular requested file, and so forth. MIME headers and their uses are generally described in more detail in the Request For Comments (RFC) 2045 entitled *Multipurpose Internet Mail Extensions (MIME) Part One: Format of Internet Message Bodies*, by N. Freed et al., published November 1996, which is available through the Internet Engineering Task Force (IETF) and is hereby incorporated by reference as though fully set forth herein.

It is often desirable to scan client-requested files for viruses or other illicit content before the files may be returned to their requesting clients. In the event that a virus is located in a requested file, the client may be notified that the file is not currently accessible.

Alternatively, the file may be "cleaned" in order to remove the virus before the file is returned to the client. As used herein, a non-viral file is defined as a file that does not contain executable code and thus is incapable of containing a virus.

The Internet Content Adaptation Protocol (ICAP) provides a mechanism for transforming (or "adapting") clients' file-access requests and/or responses according to a predetermined set of policies or rules, e.g., selected by a system administrator. Accordingly, the ICAP protocol may be configured to scan client-requested files for viruses and transform file-access responses containing those files in which viruses have been detected. Besides virus scanning of client-requested files, the ICAP protocol also may be used to perform other types of object-based content vectoring, as described in more detail in RFC 3507 entitled *Internet Content Adaptation Protocol (ICAP)*, by J. Elson et al., published April 2003, which is hereby incorporated by reference as though fully set forth herein.

A client may send a file-access request to a network cache which processes that request and prepares a corresponding response. Before returning the response to the requesting client, the cache first may forward the response to an ICAP server for virus scanning and/or other processing. If the ICAP server determines that the response includes a non-viral client-requested file, the ICAP server returns the response to the cache without modification. Then, the cache forwards the non-modified response to the requesting client. On the other hand, if the ICAP server identifies a virus in the client-requested file, the ICAP server may modify the client-requested file so as to remove the virus or may modify the response to indicate that the requested file is not presently available. In either case, the modified response is returned to the network cache, which then forwards the modified response to the requesting client.

According to the conventional ICAP arrangement, the network cache or origin server sends every file-access response to the ICAP server for a virus scan before the response may be returned to its requesting client. Although effective, this conventional arrangement suffers various disadvantages. For instance, not only does a requesting client have to wait for the network cache or origin server to retrieve the client's requested file and return an appropriate response, but the client also has to wait for the response to be sent to an ICAP server, processed by the ICAP server and returned to the network cache or origin server. The added latency that the client experiences due to the ICAP processing is generally undesirable and in some cases may negatively affect the client's functionality. Further, the frequent communications between the network cache or origin server and the ICAP server may consume an excessive amount of network bandwidth that otherwise could be used for higher-priority network traffic. In addition, when the ICAP server is coupled to a relatively large number of network caches and origin servers, the ICAP server may have to perform an exorbitant amount of virus scans which, in turn, may exhaust the server's processing resources, such as its available memory and processing bandwidth.

One technique for reducing the number of virus scans performed at the ICAP server requires the network cache or origin server to determine whether a file-access response contains a file whose filename corresponds to a non-viral file type. If so, the cache or origin server identifies the file as non-viral and returns the response to its requesting client without first having to perform conventional ICAP processing. To that end, the response may be analyzed to determine whether it contains a MIME header specifying a filename with a file extension corresponding to a non-viral file type. For example, suppose the response includes a MIME header that identifies a client-requested file having a filename "foobar.jpg." In this case, the extension ".jpg" indicates that the file is a non-viral image file formatted according to the Joint Picture Expert's Group (JPEG). Accordingly, the response containing foobar.jpg may be returned directly to the requesting client without first having to virus scan the file at the ICAP server.

A problem with the above-noted technique for reducing the amount of ICAP processing is that it may be easily circumvented by improperly named files, i.e., files whose filenames do not match their actual file types. For instance, a file having a filename foobar.jpg actually may be an executable file even though its filename says otherwise. Consequently, the filename may misidentify the file as non-viral when in fact it contains an executable virus. In this situation, the misnamed file may improperly forgo conventional ICAP virus scanning when such a scan would detect the file's virus.

It is therefore generally desirable to provide a more reliable technique for reducing the number of file-access responses that are sent to the ICAP server for processing before the responses may be forwarded to their requesting clients.

SUMMARY OF THE INVENTION

The present invention overcomes the disadvantages of the prior art by providing a system and method for reliably detecting the file type of a client-requested file and bypassing conventional ICAP processing if the detected file type corresponds to a non-viral file. To that end, the client-requested file is examined to determine whether it contains a predefined byte pattern (or "file signature") corresponding to a non-viral file type. The file signature may be embodied as one or more predetermined "magic bytes" located at known file offsets. For instance, the client-requested file may be identified as a particular type of image file if it contains the set of magic bytes associated with that image file format. Unlike prior implementations, when the client-requested file is determined to contain magic bytes corresponding to a non-viral file type, such as an image file, the file is returned to the requesting client without performing conventional ICAP virus-scanning operations. In this way, conventional ICAP processing is by-passed for client-requested files that are recognized as non-viral based on their magic bytes, thereby conserving network bandwidth and ICAP resources that otherwise would be consumed.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 3 is a schematic block diagram of an exemplary file-signature table which may be used in accordance with the illustrative embodiments.

DETAILED DESCRIPTION OF ILLUSTRATIVE EMBODIMENTS

Figure 1:
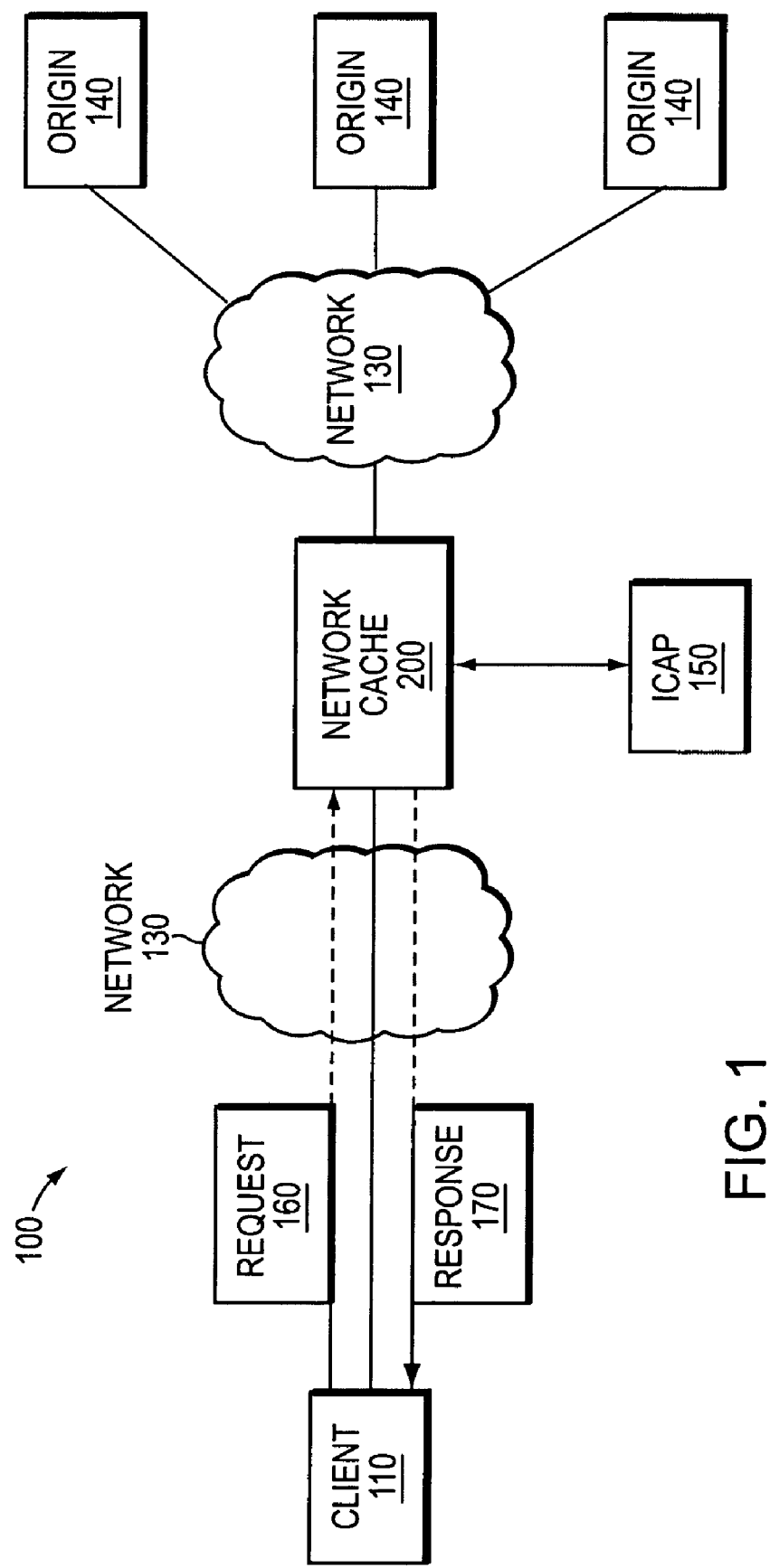
FIG. 1 is a schematic block diagram illustrating an exemplary computer network in which an illustrative embodiment of the invention may be deployed.

FIG. 1 illustrates an exemplary computer network 100 in which an illustrative embodiment of the invention may be deployed. The network includes one or more clients 110 that request files stored on a set of origin servers 140. In practice, the origin servers may be conventional HTTP or FTP servers that provide access to various types of media content, such as web pages, streaming audio or video files, image files, and so forth. As shown, the clients 110 do not directly communicate with the origin servers 140. Rather, a client sends a file-access request 160 to an intermediate network cache 200 that is coupled to the origin servers, e.g., through a network 130. Alternatively, at least some of the origin servers may be directly connected to the network cache. Likewise, the client 110 may be directly attached to the network cache or coupled to the cache, e.g., through the network 130.

The network cache 200 may be configured to operate in a forward or reverse proxy mode. That is, the network cache may be used to accelerate access to a selected subset of files stored in the origin servers 140 (reverse proxy mode) or may be configured to store copies of those files that were recently accessed from the origin servers by a selected set of clients (forward proxy mode). In either mode of operation, the cache 200 may receive a file-access request 160 from a client 110. The client's request typically identifies a particular file or web page that the client desires to access. The network cache analyzes the received request to determine whether it contains a local copy of the client-requested file. If so, the cache 200 returns its local copy of the requested file to the client in a file-access response 170. However, if the client-requested file is not already resident in the cache, the cache may be configured to retrieve the requested file from an appropriate origin server.

Although the file-access request 160 and response 170 are depicted as individual data packets exchanged between the client 110 and the network cache 200, those skilled in the art will appreciate that the request and response alternatively may be transmitted as a plurality of data packets. Typically, the request and response are formatted according to a predetermined file-access protocol, such as HTTP, and are transported using a reliable transport protocol, such as the conventional Transmission Control Protocol (TCP). More generally, the client/server communications in the illustrative embodiments may be implemented using various network protocols and physical media without limitation.

The network cache 200 is coupled to an ICAP server 150 which performs a set of services that are off-loaded from the cache. As set forth in the above-incorporated RFC 3507, the ICAP services typically include object-based content vectoring for HTTP messages. For instance, the network cache 200 may forward the file-access request 160 to the ICAP server 150. The ICAP server then may scan the content of the client's request to determine which particular file was requested by the client and whether the client is permitted to access the requested file. If the client does not have access privileges, the ICAP server may modify the client's request, e.g., to deny access to the client-requested web page or other file.

In addition, the ICAP server 150 also may process file-access responses 170 before the responses are returned to their requesting clients 110. In this regard, the server may perform, e.g., virus scans to ensure a response 170 does not contain a client-requested file that is infected with a software virus. In previous implementations, the network cache 200 sends every file-access response it prepares to the ICAP server for a virus scan before the response may be returned to its requesting client. If the ICAP server detects a virus, the response may be modified, or "cleaned", to remove the virus or the response may be modified to indicate that the client-requested file is not currently available.

Unlike prior implementations in which the ICAP server 150 performs a virus scan for every file-access response 170, the network cache 200 may be configured to identify certain types of non-viral files, thereby enabling the cache to by-pass conventional ICAP processing for those responses containing the identified non-viral files. To that end, the network cache may examine a client-requested file to determine whether it contains a predefined byte pattern (or "file signature") corresponding to a non-viral file type. The file signature may be embodied as one or more predetermined "magic bytes" located at known file offsets. For instance, the client-requested file may be identified as a particular type of image file if it contains the set of magic bytes associated with that image file format. When the client-requested file is determined to contain magic bytes corresponding to a non-viral file type, such as an image file, the response containing the client-requested file is returned to its requesting client without performing conventional ICAP virus-scanning operations. In this way, the conventional ICAP processing is by-passed for client-requested files that are recognized as non-viral based on their magic bytes, thereby conserving network bandwidth and ICAP resources.

Figure 2:
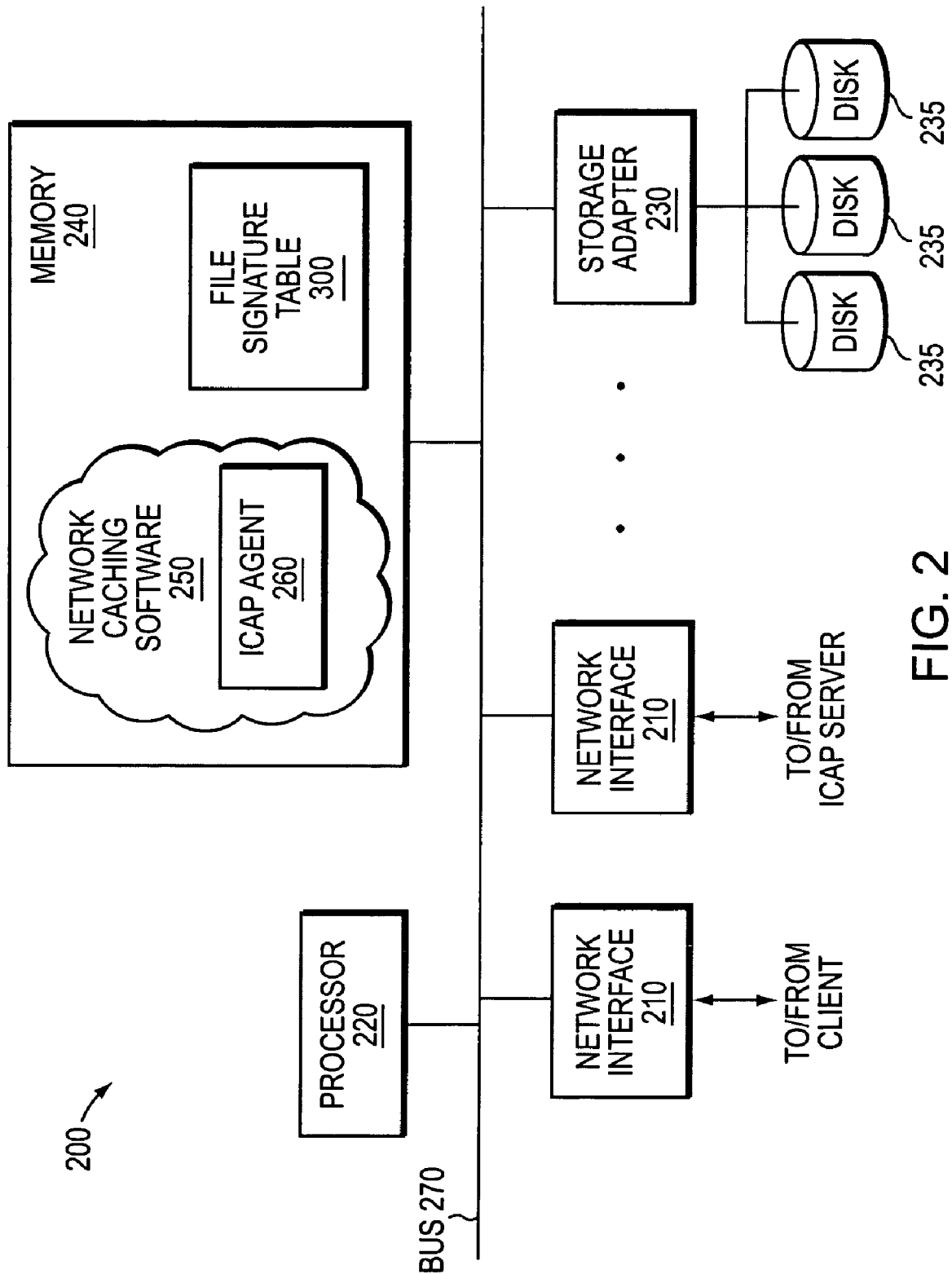
FIG. 2 is a schematic block diagram of an exemplary network cache that may be advantageously used with the present invention.

FIG. 2 is a schematic block diagram of an exemplary network cache 200 that may be advantageously used with the present invention. Although the network cache is illustrated on a generic hardware platform, the cache generally may be implemented in any type of special-purpose computer (e.g., server) or general-purpose computer. The network cache 200 comprises, among other things, one or more network interfaces 210, a processor 220, a storage adapter 230 and a memory 240 interconnected by a system bus 270.

Each network interface 210 includes the mechanical, electrical and signaling circuitry for sending and receiving data packets to/from other computers connected to the network cache 200, e.g., over Ethernet links, optical links, wireless links, etc. Each network interface 210 may contain specialized processing elements, such as logic or processors, that format in-coming and out-going data packets consistent with a predetermined network communication protocol. For example, a first network interface 210 may be configured to exchange HTTP messages with a remote client 110, e.g., coupled to the first interface over the network 130. A second network interface may be configured to communicate HTTP messages with the ICAP server 150, e.g., coupled to the second interface via the network 130.

The storage adapter 230 interfaces with one or more mass storage devices 235 to store and retrieve a set of files that are accessible to the clients 110. The storage adapter includes input/output (I/O) interface logic and circuitry that couples to the disks to the adapter over an I/O interconnect arrangement, such as a conventional Fibre-channel serial link topology. Client-requested files may be retrieved by the storage adapter 230 and, if necessary, processed by the processor 220 (or the adapter itself) prior to being forwarded over the system bus 270 to an appropriate network adapter 210. The requested file is then formatted into a file-access response and returned to the requesting client 110.

Each mass storage device 235 may be embodied as any type of writable storage device, such as a magnetic or optical disk drive, a non-volatile random access memory (e.g., FLASH memory), a magnetic or optical tape drive, an erasable programmable read-only memory (EPROM) or any other form of mass storage device. Preferably, the set of files is stored in an array of storage disks 235. The disks may be arranged as a Redundant Array of Independent Disks (RAID) group so that some disks store striped data and at least one disk stores separate parity data for the group, e.g., in accordance with a conventional RAID-4 configuration. However, other configurations (e.g. RAID-5 having distributed parity across stripes) are also contemplated.

The memory 240 comprises storage locations that are addressable by the processor and adapters for storing program code and data. The memory preferably comprises a form of random access memory (RAM) that is generally cleared by a power cycle or other reboot operation (e.g., it is a "volatile" memory). The processor and adapters comprise processing elements, logic and/or circuitry configured to execute the software code and manipulate the data stored in the memory 240. It will be apparent to those skilled in the art that various types of memory means, including computer-readable media and electromagnetic signals, may be used for storing and transporting program instructions pertaining to the inventive technique described herein.

Network caching software 250, portions of which are typically resident in the memory 240 and executed by the processor 220, functionally invokes proxy-caching operations for storing and retrieving client-requested files from the storage disks 235. To that end, the network caching software cooperates with at least one origin server 140 to acquire the set of files stored in the array of disks. The caching software 250 may be used to configure the network cache 200 as either a forward or reverse proxy server. In practice, the network caching software 250 may be embodied within a version of the NetCache™ software developed by Network Appliance, Inc. of Sunnyvale, Calif. or any other similar software that is used to manage proxy-caching operations. The network caching software 250 includes instructions for implementing an ICAP agent 260 that is configured to send HTTP messages to the ICAP server 150 and process HTTP responses received from the ICAP server. Although the ICAP agent 260 is preferably integrated into the network caching software 250, the agent alternatively may be implemented as a separate software module, e.g., resident in the memory 240.

In a preferred embodiment, the network caching software 250 includes, among other things, a plurality of executable threads that are configured to perform the inventive technique described herein. Specifically, the caching software may include one or more threads for generating and/or maintaining a file-signature table 300 and for using the table to determine whether client-requested files contain magic bytes corresponding to non-viral file types. At least some of these threads may be embodied within the ICAP agent 260, which is preferably integrated into the network caching software.

Further to the preferred embodiment, the network caching software, including the ICAP agent, is compiled into a storage operating system (not shown) that manages the operations of the network cache 200. The storage operating system provides a set of core services which may include, inter alia, providing file system semantics, I/O operations, memory management and the like. The storage operating system is preferably the NetApp® Data ONTAP™ operating system available from Network Appliance, Inc., Sunnyvale, Calif. The Data ONTAP™ operating system is generally described in more detail in the commonly-assigned patent application entitled *SYSTEM AND METHOD FOR TRACKING MODIFIED FILES IN A FILE SYSTEM* to Mark Muhlestein et al., which application was filed on Aug. 12, 2002 and assigned U.S. patent application Ser. No. 10/217,119 and is hereby incorporated by reference as though fully set forth herein. However, it is expressly contemplated that other storage operating systems may be used in accordance with the inventive principles described herein. For instance, in some embodiments, the network caching software 250 and/or the ICAP agent 260 may be coded as user processes that are not directly compiled into the storage operating system's kernel.

In operation, a client may send a file-access request 160 to a network interface 210 in the network cache 200. The network interface that receives the client's file-access request cooperates with the network caching software 250 to process the request and generate an appropriate file-access response 170. Specifically, the network caching software may instruct the storage adapter 230 to retrieve the client-requested file from the storage disks 235, then the caching software may format the retrieved file to generate the client's file-access response.

Unlike prior implementations where the ICAP agent 260 would automatically forward the generated response to the ICAP server 150 for a virus scan, the network caching software 250 instead performs its own tests to determine whether the client-requested file is a non-viral file. For example, an executable thread in the ICAP agent may invoke an "object file matching" thread that analyzes the client-requested file to determine whether the file contains a set of magic bytes corresponding to a known non-viral file type. If the result of this analysis indicates that the file is non-viral, then conventional ICAP processing is by-passed and the network caching software sends the response over the network interface 210 coupled to the requesting client. On the other hand, if the object-file-matching thread does not identify the client-requested file as being a non-viral file type, then the ICAP agent 260 forwards the response over the network interface coupled to the ICAP server for a virus scan.

Preferably, the network caching software 250 includes a thread configured to read a signature file (not shown), e.g., from the disks 235, the signature file specifying file-signature definitions of known non-viral file types. Based on the contents of the signature file, the thread generates a file-signature table 300 at a predetermined location in the memory 240. More specifically, the file-signature table stores magic-byte information associated with the known non-viral file types. The thread may build the file-signature table 300 when the network caching software 250 is initially loaded into the network cache 200, i.e., at boot time, or it can be scheduled to generate the table whenever the system administrator updates the contents of the signature file, e.g., through an appropriate command-line interface (CLI) or graphical user interface (GUI). The contents of the table 300 also may be manually configured, e.g., by a system administrator, and may be updated from time to time.

The network caching software 250, e.g., using its object-file-matching thread, compares a client-requested file with the contents of the file-signature table 300 in order to determine whether the file contains a predefined byte pattern (or "file signature") corresponding to a non-viral file type. Each file signature stored in the table 300 may indicate at least one predetermined sequence of one or more bytes ("magic bytes") and the file offset(s) where the sequence(s) begins. Accordingly, after comparing the known file signatures stored in the file-signature table with the contents of the client-requested file, the network caching software 250 can determine whether the client-requested file contains magic bytes corresponding to a non-viral file type. If it does, the file-access response 170 containing the client-requested file is returned to the requesting client without performing conventional ICAP virus-scanning operations.

FIG. 3 illustrates an exemplary file-signature table 300 which may be used in accordance with the illustrative embodiments. Each entry in the table contains a known non-viral file type 310, a sub-type 320 (if applicable), one or more sequences of magic bytes 330 and their corresponding byte offsets 340. Notably, a single file type 310 may be associated with more than one sub-type 320. For instance, the table 300 includes separate table entries for the different sub-types "87*a*" and "89*a*" that may be associated with the Graphics Interchange Format (GIF) file type. However, the file-signature table includes only a single sub-type 320 for the Joint Photographic Experts Group (JPEG) file format corresponding to the JPEG File Interchange Format (JFIF) sub-type.

Each file type 310 and sub-type 320 combination may be associated with one or more sequences of magic bytes 330. For example, the non-viral JPEG file type and JFIF sub-type combination may be identified by two different sequences of magic bytes: a first sequence containing four magic bytes equal to 0xFFD8FFE0 (in hexadecimal) located at a zero byte offset 340 and a second sequence of four magic bytes equal to 0x4A464946 located at a six byte offset in the JPEG file. Those skilled in the art will understand that the first and second sequences may be used individually or collectively for the purpose of identifying non-viral JPEG/JFIF formatted files. In addition, the table 300 also indicates that GIF files having sub-types 87*a* and 89*a* are associated with respective sequences of six magic bytes. Namely, the non-viral GIF87*a* file format can be identified by six bytes equal to 0x474946383761 located at a zero byte offset in the GIF file, whereas the non-viral GIF89*a* file format can be identified by the six bytes equal to 0x474946383961 located at a zero byte file offset.

Figure 4:
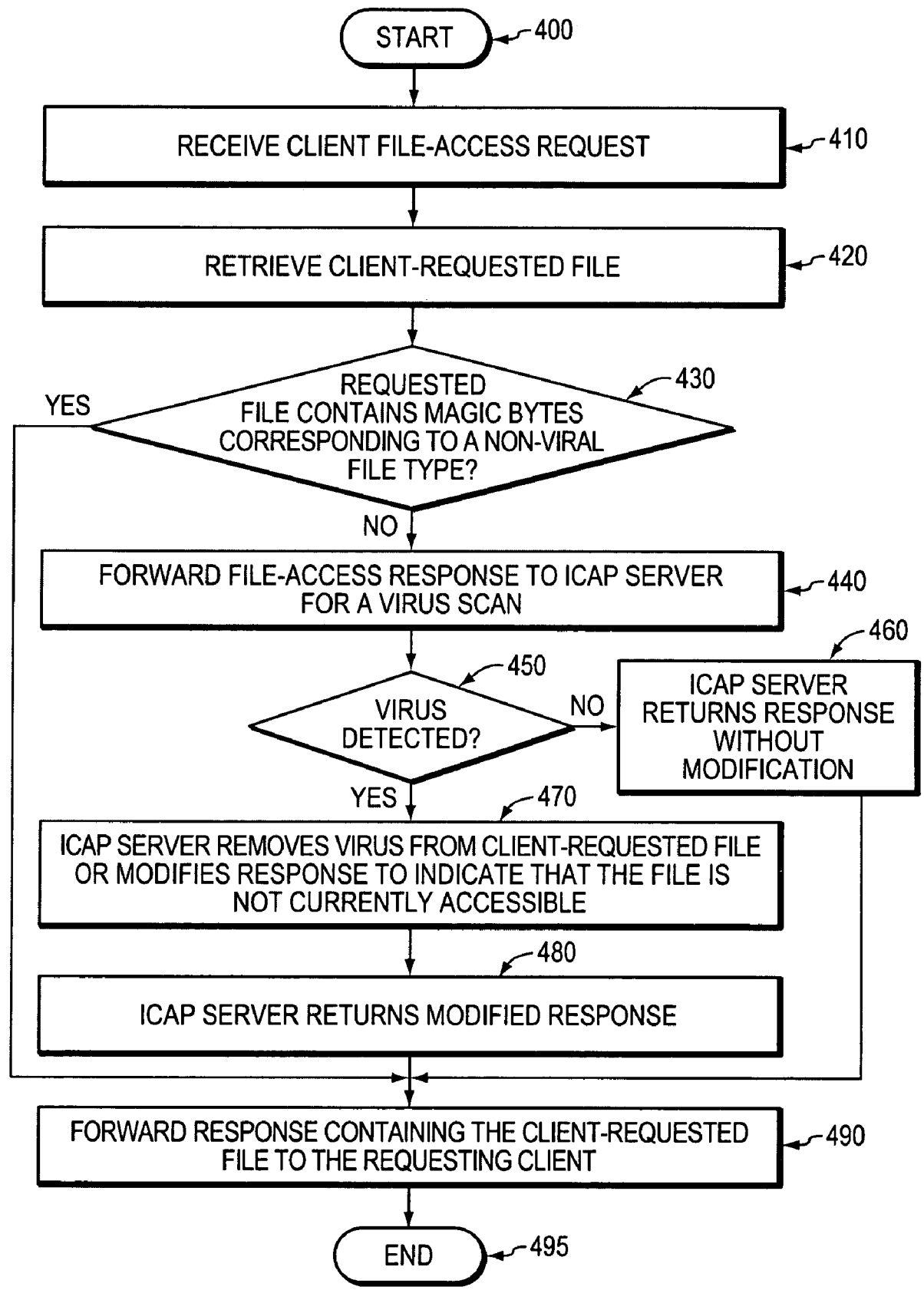
FIG. 4 is a flowchart illustrating a sequence of steps that may be performed by a network cache in accordance with the illustrative embodiments of the invention.

FIG. 4 illustrates a sequence of steps that may be performed by the network cache 200 in accordance with the illustrative embodiments of the invention. The sequence starts at step 400 and proceeds to step 410 where a file-access request 160 from a client 110 is received at the network cache. At step 420, network caching software 250 processes that received request and retrieves the client's requested file, e.g., from the array of storage disks 235. Next, at step 430, the requested file is analyzed to determine whether it contains one or more sequences of magic bytes that may be used to identify a known type of non-viral file. For instance, the contents of the client-requested file may be compared with magic-byte sequences stored in the file-signature table 300. If the client-requested file is determined to contain magic bytes for a known, non-viral file type, then the sequence advances to step 490 where the client-requested file is included in a file-access response 170 which, in turn, is forwarded to the requesting client 110. A copy of the file also may be stored at the network cache, e.g., as the cache is forwarding the file to the requesting client. The file-access response is returned to the client without first having to perform conventional virus scanning operations at an ICAP server. The sequence ends at step 495.

If the network cache 200 cannot determine that the client-requested file is non-viral based on its comparison of the file contents with known non-viral file signatures, then a file-access response 170 including the client-requested file is forwarded to the ICAP server 150 for virus scanning at steps 440-480. Specifically, the network cache forwards the file-access response 170 to the ICAP server, at step 440. Then, at step 450, if the ICAP server does not detect a virus in the client-requested file, the server returns the file-access response without modification to the network cache at step 460 and the sequence advances to step 490. On the other hand, if a virus is detected in the client-requested file at step 450, the ICAP server may remove the virus from the file or modify the file-access response to indicate that the requested file is not currently accessible, at step 470. In this case, the ICAP server returns the modified response to the network cache at step 480.

At step 490, the file-access response 170 containing the client-requested file is returned to the requesting client 110. The sequence ends at step 495. Those skilled in the art will understand that if the ICAP server 150 has modified the file-access response to indicate that the client's requested file is not currently accessible (step 470), then the modified response may be forwarded to the client without also including the viral file requested by the client.

The foregoing description has been directed to particular embodiments of this invention. It will be apparent, however, that other variations and modifications may be made to the described embodiments, with the attainment of some or all of their advantages. For instance, although the novel system and method is illustratively deployed in a network cache 200, it is also expressly contemplated that the inventive technique described herein may be implemented at the origin servers 140 or in other network devices configured to identify non-viral files. Moreover, although the exemplary network caching software 250 may be used to implement the inventive technique, other software modules, such as the ICAP agent 260, may be configured to employ the teachings herein. While the illustrative embodiments can identify non-viral files so as to by-pass conventional ICAP virus scanning operations, alternative embodiments may identify the non-viral file types for by-passing other ICAP services as well, such as file-translation services or the like.

Further to the preferred embodiment, the network caching software, including the ICAP agent, is compiled into a storage operating system (not shown) that manages the operations of the network cache 200. The storage operating system provides a set of core services which may include, inter alia, providing file system semantics, I/O operations, memory management and the like. The storage operating system is preferably the NetApp® Data ONTAP™ operating system available from Network Appliance, Inc., Sunnyvale, Calif. The Data ONTAP™ operating system is generally described in more detail in the commonly-assigned U.S. Pat. No. 6,983,296 entitled, *SYSTEM AND METHOD FOR TRACKING MODIFIED FILES IN A FILE SYSTEM* to Mark Muhlestein et al., issued on Jan. 3, 2006 and is hereby incorporated by reference as though fully set forth herein. However, it is expressly contemplated that other storage operating systems may be used in accordance with the inventive principles described herein. For instance, in some embodiments, the network caching software 250 and/or the ICAP agent 260 may be coded as user processes that are not directly compiled into the storage operating system's kernel.

What is claimed is:

1. A method for processing data-access requests at a network device, comprising:

receiving a data-access request at the network device, the data-access request specifying client-requested data to return to a requesting client;

retrieving the client-requested data;

determining, at the network device, if the client-requested data includes a predefined byte pattern corresponding to a non-viral data type;

forwarding a data-access response containing the client-requested data to the requesting client if the client-requested data is determined to include the predefined byte pattern; and forwarding the data-access response to a remote server if the client-requested data is determined not to include the predefined byte pattern, the remote server being configured to scan the client-requested data for one or more viruses.

2. The method of claim 1, wherein the remote server is an Internet Content Adaptation Protocol (ICAP) server.

3. The method of claim 1, wherein the network device is a network caching device.

4. The method of claim 3, wherein the network device is configured as a reverse-proxy cache.

5. The method of claim 3, wherein the network device is configured as a forward-proxy cache.

6. The method of claim 1, wherein the predefined byte pattern contains a single sequence of bytes.

7. The method of claim 1, wherein the predefined byte pattern contains multiple byte sequences.

8. The method of claims 1, wherein the non-viral data type corresponds to a type of image data.

9. The method of claim 8, wherein the image data is a Joint Picture Expert's Group (JPEG) data type.

10. The method of claim 8, wherein the image data is a Graphics Interchange Format (GIF) data type.

11. The method of claim 1 wherein determining comprises comparing the client-requested data with a data-signature table.

12. A network device, comprising:

means for receiving a data-access request at the network device, the data-access request specifying a client-requested data to return to a requesting client;

means for retrieving the client-requested data;

means for determining, at the network device, if the client-requested data includes a predefined byte pattern corresponding to a non-viral data type;

means for forwarding a data-access response containing the client-requested data to the requesting client if the client-requested data is determined to include the predefined byte pattern; and means for forwarding the data access response to a remote server if the client-requested data is determined not to include the predefined byte pattern, the remote server being configured to scan the client-requested data for one or more viruses.

13. The network device of claim 12, wherein the remote server is an Internet Content Adaptation Protocol (ICAP) server.

14. The network device of claim 12, wherein the network device is a network caching device.

15. The network device of claim 12, wherein the predefined byte pattern contains a single sequence of bytes.

16. The network device of claim 12, wherein the predefined byte pattern contains multiple byte sequences.

17. A network device, comprising:
a processor;
a first network interface configured to receive a data-access request, the data-access request specifying client-requested data to return to a requesting client;
a second network interface configured to communicate with a remote server, the remote server being configured to scan the client-requested data for one or more viruses; and
a memory configured to store instructions which are executable by the processor for performing the steps of:
retrieving the client-requested data;
determining, at the network device, whether the client-requested data includes a predefined byte pattern corresponding to a non-viral data type;
forwarding a data-access response containing the client-requested data over the first network interface to the requesting client if the client-requested data is determined to include the predefined byte pattern; and
forwarding the data-access response over the second network interface to the remote server if the client-requested data is determined not to include the predefined byte pattern.

18. The network device of claim 17, further comprising:
at least one storage device configured to store the client-requested data; and
a storage adapter configured to retrieve the client-requested data from the at least one storage device in response to the instructions for retrieving the client-requested data.

19. The network device of claim 17, wherein the remote server is an Internet Content Adaptation Protocol (ICAP) server.

20. The network device of claim 17, wherein the network device is a network caching device.

21. The network device of claim 17, wherein the predefined byte pattern contains a single sequence of bytes.

22. The network device of claim 17, wherein the predefined byte pattern contains multiple byte sequences.

23. A network, comprising:
a client device configured to transmit a data-access request specifying client-requested data;
a server device configured to scan the client-requested data for one or more viruses; and
a network device configured to receive the client-requested data and further configured to:
retrieve the client-requested data;
determine, at the network device, whether the client-requested data includes a predefined byte pattern corresponding to a non-viral data type;
forward a data-access response containing the client-requested data to the client device if the client-requested data is determined to include the predefined byte pattern; and
forward the data-access response to the server device if the client-requested data is determined not to include the predefined byte pattern.

24. The network of claim 23, wherein the server device is an Internet Content Adaptation Protocol (ICAP) server.

25. The network of claim 23, wherein the network device is a network caching device.

26. The network of claim 23, wherein the predefined byte pattern contains a single sequence of bytes.

27. The network of claim 23, wherein the predefined byte pattern contains multiple byte sequences.

28. A method for processing data-access requests, comprising:
receiving a data-access request at a network device, the data-access request specifying client-requested data to return to a requesting client;
retrieving the client-requested data;
comparing the client-requested data with a data-signature table to determine if the client-requested data contains a matching byte pattern indicting a non-viral data type, wherein the data-signature table is located on the network device; and
forwarding the data-access response to a remote server if the client-requested data is determined not to include the matching byte pattern, the remote server being configured to scan the client-requested data for one or more viruses.

29. A method for processing data-access requests, comprising:
receiving an access request at a network device, the access request specifying a client-requested object to return to a requesting client;
retrieving the client-requested object;
comparing, at the network device, the client-requested object with a table to determine if the client-requested object contains a matching pattern indicating a non-viral object type; and
forwarding the access response to a remote server if the client-requested object is determined not to include the matching pattern, the remote server being configured to scan the client-requested object for one or more viruses.

30. The method of claim 29 further comprising forwarding the data-access response containing the client-requested data to the requesting client if the client-requested data is determined to include the matching pattern object type.

31. The method of claim 29 wherein the object is a file.

32. The method of claim 29 wherein the pattern is a byte pattern.

33. The method of claim 29 wherein the table is a data-signature table.

34. The method of claim 33 further comprising maintaining the data-signature table using one or more threads, wherein the threads are embodied within an ICAP agent.

35. The method of claim 33 further comprising reading a signature data to generate the data-signature table.

36. The method of claim 33 further comprising indicating, by one or more data signatures stored in the data-signature table, at least one predetermined sequence of one or more bytes and corresponding offsets of the one or more bytes.

37. The method of claim 33 wherein the data-signature table includes at least one entry containing a known non-viral data type.

38. The method of claim 37 further comprising:
combining the known non-viral data type and the matching pattern object type; and associating the combination of the known non-viral data type and the matching pattern object type with one or more predefined sequences of bytes.

39. A method for processing data-access requests, comprising:

generating a data-signature table on a network cache;

receiving a data-access request at the network cache, the data-access request specifying client-requested data to return to a requesting client;

retrieving the client-requested data;

comparing the client-requested data with the data-signature table to determine if the client-requested data contains a matching byte pattern indicating a non-viral data type; and forwarding, in response to determining a viral data type for the client-requested data, the data-access response to an Internet Content Adaptation Protocol (ICAP) server to scan the client-requested data for one or more viruses.

* * * * *

UNITED STATES PATENT AND TRADEMARK OFFICE
CERTIFICATE OF CORRECTION

PATENT NO. : 7,620,991 B2  
APPLICATION NO. : 11/253405  
DATED : November 17, 2009  
INVENTOR(S) : Manik Taneja Page 1 of 1

It is certified that error appears in the above-identified patent and that said Letters Patent is hereby corrected as shown below:

Col. 9, Lines 59-67 and Col. 10, lines 1-12, please amend as shown:

~~Further to the preferred embodiment, the network caching software, including the ICAP agent, is compiled into a storage operating system (not shown) that manages the operations of the network cache 200. The storage operating system provides a set of core services which may include, inter alia, providing file system semantics, I/O operations, memory management and the like. The storage operating system is preferably the NetApp.RTM. Data ONTAP.TM. operating system available from Network Appliance, Inc., Sunnyvale, Calif. The Data ONTAP.TM. operating system is generally described in more detail in the commonly-assigned U.S. Pat. No. 6,983,296 entitled, SYSTEM AND METHOD FOR TRACKING MODIFIED FILES IN A FILE SYSTEMto Mark Muhlestein et al., issued on Jan. 3, 2006and is hereby incorporated by reference as though fully set forth herein. However, it is expressly contemplated that other storage operating systems may be used in accordance with the inventive principles described herein. For instance, in some embodiments, the network caching software 250 and/or the ICAP agent 260 may be coded as user processes that are not directly compiled into the storage operating system's kernel.~~  
<u>Further, the present invention may be adapted to identify non-viral file types in file-access requests rather than in file-access responses. For instance, a client may attach a file to its file-access request, and the attached file may be examined to determine whether it is non-viral in accordance with the teachings set forth herein. Yet other embodiments may employ the inventive technique for both file-access requests and responses. The invention may be adapted to identify various types of non-viral file formats that may be identified using magic bytes, wherein such non-viral file formats may include, but are not limited to, image files, such as JPEG and GIF files, media streams, such as MP3, AVI or MPEG files, and so forth. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.</u>

Col. 10, line 44, please amend as shown:

8. The method of ~~claims~~ <u>claim</u> 1, wherein the non-viral data type corresponds to a type of image data.

Signed and Sealed this

Fifth Day of January, 2010

David J. Kappos  
*Director of the United States Patent and Trademark Office*

UNITED STATES PATENT AND TRADEMARK OFFICE
CERTIFICATE OF CORRECTION

PATENT NO. : 7,620,991 B2  Page 1 of 1
APPLICATION NO. : 11/253405
DATED : November 17, 2009
INVENTOR(S) : Taneja et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Twenty-sixth Day of October, 2010

David J. Kappos
*Director of the United States Patent and Trademark Office*